United States Patent
Ito et al.

(10) Patent No.: US 12,522,098 B2
(45) Date of Patent: Jan. 13, 2026

(54) CHARGING AND DISCHARGING MANAGEMENT DEVICE

(71) Applicant: Prime Planet Energy & Solutions, Inc., Tokyo (JP)

(72) Inventors: Keiichi Ito, Kasai (JP); Kohki Nakamura, Okazaki (JP); Kimihiko Furukawa, Kakogawa (JP); Shinya Inui, Kakogawa (JP); Noriharu Kobayashi, Kakogawa (JP); Masaki Yugou, Kakogawa (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 664 days.

(21) Appl. No.: 17/948,230

(22) Filed: Sep. 20, 2022

(65) Prior Publication Data

US 2023/0092625 A1    Mar. 23, 2023

(30) Foreign Application Priority Data

Sep. 21, 2021 (JP) .................................. 2021-152805

(51) Int. Cl.
| | |
|---|---|
| *H02J 7/00* | (2006.01) |
| *B60L 53/62* | (2019.01) |
| *B60L 58/12* | (2019.01) |
| *B60L 58/24* | (2019.01) |
| *H02J 7/14* | (2006.01) |

(52) U.S. Cl.
CPC .............. *B60L 53/62* (2019.02); *B60L 58/12* (2019.02); *B60L 58/24* (2019.02); *H02J 7/0047* (2013.01)

(58) Field of Classification Search
CPC .............................. B60L 53/62; H02J 7/0047
USPC ..................................... 320/132, 134
See application file for complete search history.

(56) References Cited

U.S. PATENT DOCUMENTS

| | | | | |
|---|---|---|---|---|
| 2011/0313603 | A1* | 12/2011 | Laberteaux | H01M 10/48 705/412 |
| 2012/0200266 | A1* | 8/2012 | Berkowitz | H01M 10/44 320/139 |

(Continued)

FOREIGN PATENT DOCUMENTS

| | | |
|---|---|---|
| EP | 3316387 A1 | 5/2018 |
| JP | 2013102609 A | 5/2013 |

(Continued)

*Primary Examiner* — Alexis B Pacheco
(74) *Attorney, Agent, or Firm* — HAUPTMAN HAM, LLP (57) ABSTRACT

A charge and discharge management device disclosed herein includes an acquisition controller configured or programmed to acquire information on a predetermined deterioration acceleration element for on-vehicle batteries from a plurality of electric vehicles connected to an electric power system, an arithmetic controller configured or programmed to arithmetically operate deterioration acceleration element values of the plurality of electric vehicles, based on a predetermined arithmetic operation method, based on the information on the deterioration acceleration element, and a determination controller configured or programmed to control charging the plurality of electric vehicles from the electric power system or discharging the electric power system from the plurality of electric vehicles, based on the deterioration acceleration element values of the plurality of electric vehicles.

11 Claims, 2 Drawing Sheets

(56) References Cited

U.S. PATENT DOCUMENTS

| | | | |
|---|---|---|---|
| 2013/0179061 A1* | 7/2013 | Gadh | B60L 53/305 |
| | | | 701/1 |
| 2014/0320062 A1* | 10/2014 | Murayama | B60L 53/63 |
| | | | 320/134 |
| 2015/0253744 A1 | 9/2015 | Kobayashi | |
| 2015/0291050 A1* | 10/2015 | Luo | H02J 7/0071 |
| | | | 320/162 |
| 2016/0075247 A1* | 3/2016 | Uyeki | H02J 3/00 |
| | | | 455/456.3 |
| 2018/0123360 A1* | 5/2018 | Eaves | H02J 7/00034 |
| 2020/0055419 A1* | 2/2020 | Kim | G06Q 10/02 |
| 2020/0231058 A1 | 7/2020 | Hishida et al. | |
| 2020/0250693 A1* | 8/2020 | Kanamori | G06Q 50/06 |
| 2020/0282855 A1* | 9/2020 | Slutzky | B60L 53/64 |
| 2020/0313436 A1 | 10/2020 | Tsuda | |
| 2021/0170903 A1* | 6/2021 | Tsuchiya | B60L 58/16 |
| 2021/0190867 A1* | 6/2021 | Fan | G01R 31/3842 |
| 2021/0284039 A1* | 9/2021 | Ando | H04W 4/44 |
| 2021/0379999 A1 | 12/2021 | Yang et al. | |
| 2022/0001763 A1* | 1/2022 | Chadha | B60L 53/66 |
| 2022/0357406 A1* | 11/2022 | Lu | H01M 10/425 |
| 2023/0103122 A1* | 3/2023 | Tsuda | G01R 31/392 |
| | | | 701/32.1 |

FOREIGN PATENT DOCUMENTS

| | | |
|---|---|---|
| JP | 2015035382 A | 2/2015 |
| JP | 2019216528 A | 12/2019 |
| JP | 2020115707 A | 7/2020 |
| JP | 2020162304 A | 10/2020 |
| WO | 2014057599 A1 | 4/2014 |
| WO | 2016208251 A1 | 12/2016 |
| WO | 2020090341 A1 | 5/2020 |

\* cited by examiner

CHARGING AND DISCHARGING MANAGEMENT DEVICE

CROSS REFERENCE TO RELATED APPLICATIONS

The present application claims priority from Japanese Patent Application No. 2021-152805 filed on Sep. 21, 2021, which is incorporated by reference herein in its entirety.

BACKGROUND

The present disclosure relates to a charge and discharge management device.

Japanese Laid-open Patent Publication No. 2020-162304 discloses a battery control system including a storage battery that is connected to a power network to charge and discharge electric power and a control device that controls charging and discharging of the storage battery. The control device disclosed in Japanese Laid-open Patent Publication No. 2020-162304 is characterized by, if a deterioration state of the storage battery at a time when a predetermined time has elapsed since a start of use of the storage battery satisfies a predetermined condition, changing contents of charging and discharging control of the storage battery. According to the battery control system, charging and discharging of the storage battery is controlled based on the deterioration state of the storage battery. Thus, it is considered that profitability of a customer that owns the storage battery can be increased.

Japanese Laid-open Patent Publication No. 2020-115707 discloses a control device including a demand information acquisition controller that acquires information indicating a power demand in a region including a destination of a vehicle and a controller that preferentially charges a vehicle that moves to a region in which a power demand is high. According to the control device, the vehicle that moves to the region in which the power demand is high is preferentially charged. Thus, it is considered that the vehicle can contribute the power demand.

SUMMARY

A technology of effectively utilizing electric power using an on-vehicle battery mounted on an electric vehicle has been proposed. For example, a so-called vehicle-to-grid (V2G) that supplies electric power to an electric power system from an electric vehicle has been proposed. However, in an on-vehicle battery of an electric vehicle that participates in V2G, charging and discharging can be repeated in order to meet a power demand. As a result, there is a concern that deterioration of the on-vehicle battery is accelerated. The present inventors would like to propose a technology that reduces deterioration of an on-vehicle battery in an electric vehicle that participates in V2G.

A charging and discharging management device disclosed herein includes an acquisition controller configured or programmed to acquire information on a predetermined deterioration acceleration element for on-vehicle batteries from a plurality of electric vehicles connected to an electric power system, an arithmetic controller configured or programmed to arithmetically operate deterioration acceleration element values of the plurality of electric vehicles, based on a predetermined arithmetic operation method, based on the information on the deterioration acceleration element, and a determination controller configured or programmed to control charging the plurality of electric vehicles from the electric power system or discharging the electric power system from the plurality of electric vehicles, based on the deterioration acceleration element values of the plurality of electric vehicles. According to the charging and discharging management device, in an electric vehicle that participates in V2G, charging and discharging can be controlled such that deterioration of an on-vehicle battery is reduced.

The determination controller may include a first determination controller configured or programmed to assign, in response to a discharging request from the electric power system, a priority order of the plurality of electric vehicles, based on the deterioration acceleration element values of the plurality of electric vehicles.

The first determination controller may be configured or programmed to acquire positional information of a position in which each of the electric vehicles is connected to calculate a power transmission distance between the position in which the electric vehicle is connected and a position in which there is a discharging request from the electric power system, and may be configured or programmed to further assign the priority order of the plurality of electric vehicles, based on the power transmission distance.

The determination controller may include a second determination controller configured or programmed to determine, in response to a discharging request from the electric power system, a discharge rate of each of the plurality of electric vehicles, based on the deterioration acceleration element values of the plurality of electric vehicles.

The determination controller may include a first determination controller configured or programmed to assign, in response to a charging request from the electric power system, a priority order of the plurality of electric vehicles, based on the deterioration acceleration element values of the plurality of electric vehicles.

The determination controller may include a second determination controller configured or programmed to determine, in response to a charging request from the electric power system, a charge rate of each of the plurality of electric vehicles, based on the deterioration acceleration element values of the plurality of electric vehicles.

The information on the deterioration acceleration element may include at least SOC information and temperature information for the on-vehicle batteries.

The charge and discharge management device may further include a storage that stores a map in which a relationship between an SOC and temperature of each of the on-vehicle batteries and a corresponding one of the deterioration acceleration element values is indicated in advance. The arithmetic controller may arithmetically operate the deterioration acceleration element values of the on-vehicle batteries, based on information of the SOC and the temperature acquired from each of the on-vehicle batteries and the map.

DETAILED DESCRIPTION

With reference to the attached drawings, a embodiment of a charge and discharge management device disclosed herein will be described below. As a matter of course, the embodiment described herein is not intended to be particularly limiting the present disclosure. The present disclosure is not limited to the embodiment described herein, unless specifically stated otherwise.

<Charging and Discharging Management System 100>

Figure 1:
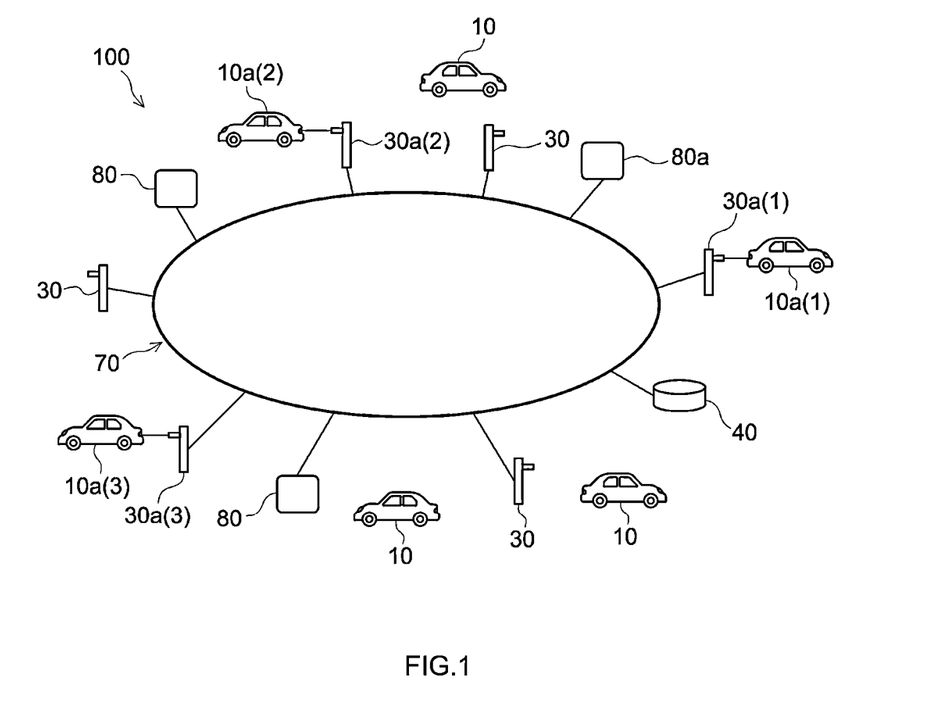
FIG. 1 is a conceptual diagram illustrating a connection relationship of a charging and discharging management system 100.
Figure 2:
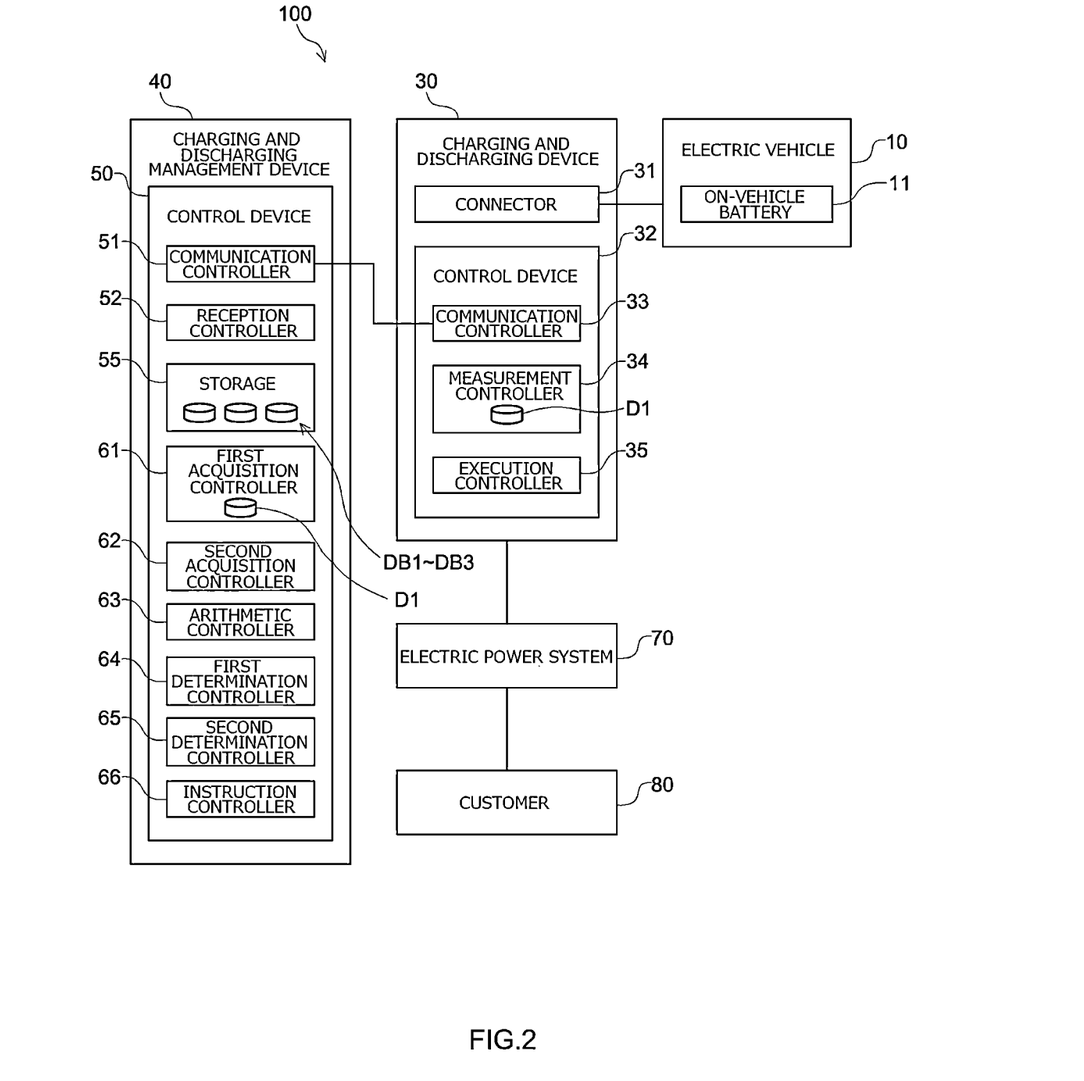
FIG. 2 is a block diagram illustrating the charging and discharging management system 100.

FIG. 1 is a conceptual diagram illustrating a connection relationship of a charging and discharging management system 100. FIG. 2 is a block diagram illustrating the charging and discharging management system 100. The charging and discharging management system 100 manages charging and discharging performed on an electric vehicle 10. As illustrated in FIG. 1, the charging and discharging management system 100 includes a plurality of charging and discharging devices 30 that perform charging and discharging on the electric vehicles 10 and a charging and discharging management device 40 that controls the charging and discharging devices 30. The charging and discharging management system 100 includes a power storage device (not illustrated) in which electric power is stored. The plurality of charging and discharging devices 30 are connected to the power storage device so as to be able to perform charging and discharge. The charging and discharging management system 100 manages charging electric power stored in the power storage device to the electric vehicle 10 and storing electric power discharged from the electric vehicle 10 in the power storage device in accordance with a power demand of an electric power system 70. The electric power stored in the power storage device is sold to a specific company, such as an electric power company or the like. The charging and discharging management system 100 can be used for trading electric power, that is, selling and purchasing electric power.

Herein, a person who manages the charging and discharging management system 100 will be referred to a system administrator. The system administrator is also called aggregator. The system administrator controls a demand amount of electric power to keep a balance between demand and supply of electric power. In order to ensure a necessary electric power amount, the system administrator preferably has contracts with as many users of electric vehicles 10 as possible and preferably manages as many charging and discharging devices 30 as possible.

A plurality of electric vehicles 10 that participate in V2G are registered in the charging and discharging management system 100. The charging and discharging management system 100 manages a plurality of charging and discharging devices. The charging and discharging management system 100 manages electric power by supplying electric power to the charging and discharging devices 30 from the electric vehicles 10 in response to a discharging request from the electric power system 70 to the electric vehicles 10 and supplying electric power to the electric vehicles 10 from the charging and discharging devices 30 in response to a charging request from the electric power system 70 to the electric vehicles 10.

The electric power system 70 is configured by electric equipment that performs power generation, power transmission, power transformation, power distribution, or the like. The electric power system 70 supplies electric power to electric equipment of a customer 80 in accordance with a power demand. The electric power amount is adjusted such that a balance between demand and supply is kept. Such adjustment for electric power demand and supply can be managed by the aggregator. The aggregator can grasp the power demand, for example, by a management device (not illustrated). The aggregator can instruct charging and discharging that is performed on the electric power system 70 by the charging and discharging management device 40.

<Charging and Discharging Device 30>

The charging and discharging device 30 is used for performing charging and discharging on an on-vehicle battery 11 of the electric vehicle 10 (see FIG. 2). The charging and discharging device 30 is installed in a charging spot provided in, for example, a home, a business, a commercial facility, a hospital, a gas station, a car dealer, or the like. As illustrated in FIG. 2, the charging and discharging device 30 includes a connector 31 and a control device 32. The control device 32 includes a communication controller 33, a measurement controller 34, and an execution controller 35. The control device 32 can be, for example, a microcomputer. Each of the controllers 33 to 35 of the control device 32 may be realized by one or more processors and may be incorporated into a circuit. The communication controller 33 is configured or programmed to be communicable with the charging and discharging management device 40.

The connector 31 of the charging and discharging device 30 is connected to the electric vehicle 10. The charging and discharging device 30 is configured to be able to charge and discharge the on-vehicle battery 11 via the connector 31. Although not particularly limited, as the connector 31, for example, a charging and discharging cable or the like can be used. The charging and discharging device 30 is configured to be able to supply electric power to the electric power system 70 from the on-vehicle battery 11 via the connector 31. The electric vehicle 10 is connected to the electric power system 70 via the charging and discharging device 30.

<Electric Vehicle 10>

The electric vehicle 10 is a vehicle on which the on-vehicle battery 11 that can be charged and discharged is mounted. The electric vehicle 10 travels using electric power obtained from the on-vehicle battery 11 as an energy source. Examples of the electric vehicle 10 include vehicles, such as a battery electric vehicle (BEV), a hybrid electric vehicle (HEV), a plug-in hybrid electric vehicle (PHEV), or the like, that use electric power as an energy source. The electric vehicle 10 may be a four-wheel vehicle and may be a two-wheel vehicle. The on-vehicle battery 11 mounted on the electric vehicle 10 can be configured of a plurality of storage batteries. A plurality of electric vehicles 10 that can be connected to the electric power system 70 are registered in the charging and discharging management system 100. An on-vehicle battery ID is set for the on-vehicle battery 11 such that a state or the like of the on-vehicle battery 11 can be individually grasped.

Incidentally, in the on-vehicle battery 11 mounted on the electric vehicle 10, deterioration can progress in accordance with various elements. As used herein, an element that can cause deterioration of the on-vehicle battery 11 is referred to as a deterioration acceleration element. Although not particularly limited, examples of the deterioration acceleration element include temperature of the on-vehicle battery 11, a charge rate of the on-vehicle battery, a charge and discharge rate, or the like. For example, deterioration of the on-vehicle battery 11 can progress by keeping the on-vehicle battery 11 at high temperature. Deterioration of the on-vehicle battery 11 can progress by keeping the on-vehicle battery 11 in a state where a battery charge rate thereof is high, that is, a so-called high state of charge (SOC) for a long time. Deterioration of the on-vehicle battery 11 can progress by repeating charging and discharging at a high rate. A full charge capacity is reduced by deterioration of the on-vehicle battery 11. As a result, an asset value of the electric vehicle 10 can be reduced. The present inventors want to control charging and discharging, based on a deterioration acceleration element of the on-vehicle battery 11, and reduce deterioration of the on-vehicle battery 11 mounted on the electric vehicle 10 that participates V2G.

<Charging and Discharging Management Device 40>

The charging and discharging management device 40 manages the power demand of the electric power system 70 and charging and discharging performed on the on-vehicle battery 11 of the electric vehicle 10. The charging and discharging management device 40 can control charging and discharging of the on-vehicle battery 11 of the electric vehicle 10 in accordance with the power demand of the electric power system 70. The charging and discharging management device 40 can control charging and discharging, based on information D1 on a deterioration acceleration element or the like. The charging and discharging management device 40 may be realized by a single computer and may be realized by a plurality of computers in cooperation. The charging and discharging management device 40 can be managed by the system administrator of the charging and discharging management system 100.

The charging and discharging management device 40 includes a control device 50. The control device 50 can be, for example, a microcomputer. The control device 50 includes a communication controller 51, a reception controller 52, a storage 55, a first acquisition controller 61, a second acquisition controller 62, an arithmetic controller 63, a first determination controller 64, a second determination controller 65, and an instruction controller 66. Each of the controllers 51 to 66 of the control device 50 may be realized by one or more processors and may be incorporated into a circuit. The communication controller 51 is configured or programmed to be communicable with the charging and discharging device 30.

In this embodiment, the storage 55 stores a deterioration acceleration element value database DB1, a power demand database DB2, and a positional information database DB3. In the deterioration acceleration element value database DB1, information used for arithmetically operating a deterioration acceleration element value is stored. In this specification, the deterioration acceleration element value is obtained by scoring an element that can cause progress of deterioration of the on-vehicle battery 11 of the electric vehicle 10. The deterioration acceleration element value is arithmetically operated based on parameters that can be measured from a control device of the electric vehicle 10 and an external device of the electric vehicle 10, such as the charging and discharging device 30, or the like. In the deterioration acceleration element value database DB1, a deterioration acceleration element and a deterioration acceleration degree of the on-vehicle battery 11 are registered in association with each other.

In the power demand database DB2, information related to the power demand of the electric power system 70 is stored. In the power demand database DB2, for example, the power demand of the electric power system 70 may be registered in association with a time. In the power demand database DB2, a power demand predicted based on a power demand of the electric power system 70 in past may be registered in association with a time.

The charging and discharging management device 40 is configured such that a process of acquiring the information D1 on the predetermined deterioration acceleration element for the on-vehicle batteries 11 from a plurality of electric vehicles 10a connected to the electric power system 70 (see FIG. 1), a process of arithmetically operating deterioration acceleration element values of the plurality of electric vehicles 10a, based on a predetermined arithmetic operation method, based on the information D1 on the predetermined deterioration acceleration element, and a process of controlling charging of electric power from power systems 70 of the plurality of electric vehicles 10a or discharging electric power to the electric power systems 70, based on the deterioration acceleration element values of the plurality of electric vehicles 10a are executed. Each of the processes will be specifically described below. The processes are executed only for the electric vehicles 10a connected to the electric power system 70. For example, the processes are not executed for the electric vehicle 10 during traveling and the electric vehicle 10 that is not connected to the electric power system 30.

<Process of Acquiring Information D1 on Deterioration Acceleration Element>

The first acquisition controller 61 is configured or programmed to acquire the information D1 on the deterioration acceleration element for the on-vehicle battery 11 from the electric vehicle 10. In this embodiment, the information D1 on the deterioration acceleration element includes SOC information and temperature information of the on-vehicle battery 11. The first acquisition controller 61 acquires the information D1 on the deterioration acceleration element for the on-vehicle battery 11 from the electric vehicle 10a connected to the electric power system 70 in a state where power is off among the electric vehicles 10. When acquiring the information D1 on the deterioration acceleration element, the first acquisition controller 61 acquires the on-vehicle battery ID of the on-vehicle battery 11 at a same time.

In this embodiment, when power of the electric vehicle 10a is turned off and the electric vehicle 10a is connected to a connector 31 of a charging and discharging device 30a (see FIG. 1), the measurement controller 34 measures a battery temperature, a battery current, a battery voltage, or the like of the on-vehicle battery 11. These measurement values can be obtained, for example, by a temperature sensor, a current sensor, a voltage sensor, or the like. The measurement values are transmitted to the charging and discharging management device 40 via the communication controller 33. The first acquisition controller 61 acquires the temperature and the SOC of the on-vehicle battery 11 as the information D1 on the deterioration acceleration element by calculating the information D1 on the deterioration acceleration element from the measurement values. Although there is no particular limitation on a method for calculating the SOC, the SOC may be calculated from an integrated value of the battery current measured by the current sensor and may be calculated from a relationship between the battery voltage measured by the voltage sensor and the SOC. In this embodiment, the SOC is calculated by the first acquisition controller 61 of the charging and discharging management device 40, but calculation of the SOC is not limited thereto. For example, the SOC may be calculated by the charging and discharging device 30 and the calculated SOC may be transmitted to the charging and discharging management device 40. In a case where the on-vehicle battery 11 is configured of a plurality of storage batteries, as the temperature and the SOC of the on-vehicle battery 11, average temperature and an average SOC of the plurality of storage batteries can be calculated. In this embodiment, the first acquisition controller 61 acquires the information D1 on the deterioration acceleration element repeatedly at certain intervals (for example, every minute).

The first acquisition controller 61 may be configured to acquire some other information than the information D1 on the deterioration acceleration element. For example, the first acquisition controller 61 may be configured to acquire a state of health (SOH) indicating a deterioration acceleration degree of the on-vehicle battery 11. The SOH can be calculated, for example, using the battery current, the battery voltage, the battery temperature, or the like measured by the measurement controller 34 of the charging and discharging device 30.

<Process of Arithmetically Operating Deterioration Acceleration Element Value>

The arithmetic controller 63 is configured or programmed to arithmetically operate the deterioration acceleration element value, based on the predetermined arithmetic operation method, based on the information D1 on the deterioration acceleration element acquired by the first acquisition controller 61. In this embodiment, the arithmetic controller 63 arithmetically operates the deterioration acceleration element value by comparing the information D1 on the deterioration acceleration element with the deterioration acceleration element value database DB1 stored in the storage 55.

In the deterioration acceleration element value database DB1, the information D1 on the deterioration acceleration element is registered in association with the deterioration acceleration degree that has been scored. The deterioration acceleration degree that has been scored will be hereinafter also referred to as a "deterioration acceleration score." The higher the deterioration acceleration score is, the higher a risk that deterioration of the on-vehicle battery 11 progresses becomes. In this embodiment, as described above, as the deterioration acceleration elements, the temperature and the SOC of the on-vehicle battery 11 are set. Although not particularly limited, in this embodiment, in the deterioration acceleration element value database DB1, a battery temperature table illustrating a relationship between the temperature of the on-vehicle battery 11 and the deterioration acceleration score and an SOC table illustrating a relationship between the SOC and the deterioration acceleration score are stored.

An example of the battery temperature table illustrating a relationship between the battery temperature and the deterioration acceleration score is illustrated in Table 1. A deterioration acceleration score based on the battery temperature (Score 1) is calculated based on the battery temperature table. In the battery temperature table illustrated in Table 1, Score 1 is assigned every 5° C. of the battery temperature. An example of the SOC table illustrating a relationship between the SOC and the deterioration acceleration score is illustrated in Table 2. A deterioration acceleration score based on the SOC (Score 2) is calculated based on the SOC table. In the SOC table illustrated in Table 2, Score 2 is assigned every 5% of the SOC. In each table, the expression "A to B" means "more than A and B or less." For example, in Table 1, in a case where the battery temperature is higher than 45° C. and 50° C. or lower, Score 1 is evaluated to be 90.

TABLE 1

| Battery Temperature (° C.) | Score 1 |
|---|---|
| 65 to | 100 |
| 60 to 65 | 100 |
| 55 to 60 | 100 |
| 50 to 55 | 100 |
| 45 to 50 | 90 |
| 40 to 45 | 80 |
| 35 to 40 | 70 |
| 30 to 35 | 60 |
| 25 to 30 | 40 |
| 20 to 25 | 20 |

TABLE 1-continued

| Battery Temperature (° C.) | Score 1 |
|---|---|
| 15 to 20 | 0 |
| 10 to 15 | 0 |
| to 10 | 0 |

TABLE 2

| SOC (%) | Score 2 |
|---|---|
| 95 to 100 | 100 |
| 90 to 95 | 95 |
| 85 to 90 | 90 |
| 80 to 85 | 85 |
| 75 to 80 | 80 |
| 70 to 75 | 75 |
| 65 to 70 | 70 |
| 60 to 65 | 65 |
| 55 to 60 | 60 |
| 50 to 55 | 55 |
| 45 to 50 | 50 |
| 40 to 45 | 45 |
| 35 to 40 | 40 |
| 30 to 35 | 35 |
| 25 to 30 | 30 |
| 20 to 25 | 25 |
| 15 to 20 | 20 |
| 10 to 15 | 15 |
| 5 to 10 | 10 |
| 0 to 5 | 5 |
| 0 | 0 |

The arithmetic controller 63 is configured or programmed to determine Score 1 from the battery temperature table and the battery temperature The arithmetic controller 63 is configured or programmed to determine Score 2 from the SOC table and the SOC. The arithmetic controller 63 is configured or programmed to arithmetically operate the deterioration acceleration element value by adding Score 1 and Score 2.

In this embodiment, as described above, the information D1 on the deterioration acceleration element is repeatedly acquired at certain intervals. The arithmetic controller 63 determines Score 1 and Score 2 from the information D1 on the deterioration acceleration element and calculates the deterioration acceleration element value by sequential integrating obtained values for each of Score 1 and Score 2. Such processes described above are individually executed for each of the on-vehicle batteries 11 of the plurality of electric vehicles 10a connected to the charging and discharging devices 30a. The deterioration acceleration element value is calculated for each of the on-vehicle batteries 11 of the plurality of electric vehicles 10a in association with the on-vehicle battery ID.

A relationship between the deterioration acceleration element and the deterioration acceleration degree can differ depending on battery characteristics of the on-vehicle battery 11. The battery characteristics can differ, for example, depending on a chemical substance, such as an active material, an electrolytic liquid component, or the like, included in the on-vehicle battery 11. Another example of the SOC table illustrating a relationship between the SOC and the deterioration acceleration score is illustrated in Table 3. Setting of Score 2 differs between the SOC table of Table 3 and the SOC table of Table 2. The SOC table of Table 3 and the SOC table of Table 2 can be applied to the on-vehicle batteries 11 having different battery characteristics. As described above, in the deterioration acceleration element value database DB1, a plurality of different battery temperature tables and a plurality of different SOC tables may be stored depending on battery types or the like used for the on-vehicle batteries 11. In this case, in order to prevent increase in a difference between the scores depending on the battery types or the like, a standardized score may be set. Scores 1 and 2 used for an arithmetic operation of the deterioration acceleration element value may be modified in accordance with states of the on-vehicle batteries 11 as appropriate. For example, a battery temperature table and an SOC table corresponding to SOHs or the like of the on-vehicle batteries 11 may be set.

TABLE 3

| SOC (%) | Score 2 |
|---|---|
| 95 to 100 | 80 |
| 90 to 95 | 80 |
| 85 to 90 | 90 |
| 80 to 85 | 90 |
| 75 to 80 | 95 |
| 70 to 75 | 100 |
| 65 to 70 | 90 |
| 60 to 65 | 80 |
| 55 to 60 | 70 |
| 50 to 55 | 60 |
| 45 to 50 | 50 |
| 40 to 45 | 40 |
| 35 to 40 | 30 |
| 30 to 35 | 20 |
| 25 to 30 | 10 |
| 20 to 25 | 0 |
| 15 to 20 | 0 |
| 10 to 15 | 0 |
| 5 to 10 | 0 |
| 0 to 5 | 0 |
| 0 | 0 |

The arithmetic operation of the deterioration acceleration element value is not limited to an arithmetic operation using a table illustrating a relationship between the deterioration acceleration element and the deterioration acceleration degree. In the deterioration acceleration element value database DB1, for example, a relational expression for the deterioration acceleration element and the deterioration acceleration degree may be stored. In the deterioration acceleration element value database DB1, a map in which a relationship among an SOC, temperature, and deterioration acceleration element value of an on-vehicle battery is indicated may be stored in advance. In the process of arithmetically operating the deterioration acceleration element value, the deterioration acceleration element value of the on-vehicle battery 11 may be arithmetically operated based on information of the SOC and the temperature acquired from the on-vehicle battery 11 and the map. By using the map described above, the deterioration acceleration element value can be arithmetically operated more appropriately.

<Process of Controlling Charging or Discharging>

The first determination controller 64 and the second determination controller 65 of the control device 50 control charging from the electric power system 70 of the plurality of electric vehicles 10a or discharging to the electric power system 70, based on the arithmetically operated deterioration acceleration element values. Control of charging or discharging can be, for example, determining a priority order of charging and discharging performed on the plurality of electric vehicles 10a connected to the electric power system 70, determining the charge and discharge rate of charging and discharging performed on the electric vehicles 10a, or the like. The charging and discharging management device 40 receives a charging request or a discharging request from the electric power system 70 to start a process described above.

The reception controller 52 of the charging and discharging management device 40 is configured or programmed to receives the charging request or the discharging request from the electric power system 70. In this embodiment, the reception controller 52 receives the charging request or the discharging request, based on the power demand database DB2. In a time of day during which the power demand is high, the reception controller 52 can receive the discharging request from the electric power system 70. The discharging request can include information of a shortage amount of electric power in the electric power system 70. In a time of day during which the power demand is low, the reception controller 52 can receive the charging request from the electric power system 70. The charging request can include information of an excessive amount of electric power in the electric power system 70.

A timing at which the charging request and the discharging request (which will be hereinafter referred to as a "charging and discharging request" as well) are generated may be predetermined based on the power demand database DB2. For example, a configuration in which the charging and discharging request is transmitted to the reception controller 52 from the storage 55 at a predetermined timing, based on a power demand predicted from power demands in past, may be employed. Generation of the charging and discharging request is not limit thereto. For example, the charging and discharging request may be generated in accordance with a request of the customer 80 an electric equipment of which is connected to the electric power system 70. The aggregator may manage the power demand described above and may adjust a timing of the charging and discharging request and the shortage or excessive amount of electric power.

In this embodiment, as a process of controlling charging from the electric power system 70 or discharging to the electric power system 70, in response to the discharging request from the electric power system 70, the charging and discharging management device 40 assigns a priority order of the plurality or electric vehicles 10a, based on the deterioration acceleration element values of the plurality of electric vehicles 10a. When the reception controller 52 receives the discharging request, the deterioration acceleration element values arithmetically operated by the arithmetic controller 63 are transmitted to the first determination controller 64.

The first determination controller 64 is configured or programmed to assign a priority order to the plurality of electric vehicles 10a, based on the deterioration acceleration element values. The first determination controller 64 receives the deterioration acceleration element values of the plurality of electric vehicles 10a connected to the electric power system 70. For example, as illustrated in Table 4, the deterioration acceleration element values received by the first determination controller 64 are associated with respective on-vehicle IDs. The first determination controller 64 rearranges the on-vehicle batteries 11 in a descending order of the deterioration acceleration element values. Thus, for example, as illustrated in Table 5, a priority order is assigned to the on-vehicle batteries 11 of the electric vehicles 10a from which electric power is discharged to the electric power system 70. The first determination controller 64 determines the on-vehicle battery 11 of the electric vehicle 10a from which electric power is discharged to the electric power system 70, based on the priority order. For example, the number of electric vehicles 10a from which electric power is discharged may be set in accordance with an electric power amount of the discharging request of the electric power system 70. In this case, multiple ones of the electric vehicles 10a from which electric power is discharged can be set in an order from the electric vehicles 10a with a higher priority.

TABLE 4

| On-vehicle Battery ID | Deterioration Acceleration Element Value |
| --- | --- |
| BT00001 | 20450 |
| BT00002 | 64355 |
| BT00003 | 1043455 |
| BT00004 | 876400 |
| BT00005 | 876705 |
| BT00006 | 20990 |
| BT00007 | 4540 |
| BT00008 | 34555 |
| BT00009 | 23445 |
| BT00010 | 756210 |
| BT00011 | 690 |
| BT00012 | 2309440 |
| BT00013 | 17450 |
| BT00014 | 3475095 |

TABLE 5

| Priority Order | On-vehicle Battery ID | Deterioration Acceleration Element Value |
| --- | --- | --- |
| 1 | BT00014 | 3475095 |
| 2 | BT00012 | 2309440 |
| 3 | BT00003 | 1043455 |
| 4 | BT00005 | 876705 |
| 5 | BT00004 | 876400 |
| 6 | BT00010 | 756210 |
| 7 | BT00002 | 64355 |
| 8 | BT00008 | 34555 |
| 9 | BT00009 | 23445 |
| 10 | BT00006 | 20990 |
| 11 | BT00001 | 20450 |
| 12 | BT00013 | 17450 |
| 13 | BT00007 | 4540 |
| 14 | BT00011 | 690 |

Herein, the charging and discharging management device 40 may be configured to further change the priority order assigned in accordance with the deterioration acceleration element values. For example, the priority order may be further changed, based on positional information. In this embodiment, the charging and discharging management device 40 acquires the positional information for connection of each of the electric vehicles 10a to calculate a power transmission distance between a position in which the electric vehicle 10a is connected and a position in which there is a discharging request from the electric power system 70, and further assigns the priority order of the plurality of electric vehicles, based on the power transmission distance. The storage 55 of the charging and discharging management device 40 stores the positional information database DB3. In the positional information database DB3, positional information of the charging and discharging devices 30 and positional information of equipment of the customer 80 or the like in which the charging and discharging request can be generated are stored. In the positional information database DB3, for example, information for lengths of a power line and a power distribution line that connects the charging and discharging devices 30 and the customer 80 or the like are registered in association with the positional information.

The first determination controller 64 is configured or programmed to acquire, from the positional information of the charging and discharging devices 30a and the on-vehicles ID of the on-vehicle batteries 11 connected to the charging and discharging devices 30a, the positional information of the electric vehicle 10a on which each of the on-vehicle batteries 11 is mounted. The first determination controller 64 calculates a power transmission distance between a position of the electric vehicle 10a on which each of the on-vehicle batteries 11 is mounted and a position in which there is a discharging request (for example, a discharge destination of the customer 80 or the like). The priority order assigned in accordance with the deterioration acceleration element values can be further changed using the calculated power transmission distance. For example, in FIG. 1, the plurality of charging and discharging devices 30a to which the electric vehicles 10a are connected are illustrated. A numerical value in parentheses of each of the electric vehicles 10a and the charging and discharging devices 30a indicates an order of a distance from a customer 80a in which there is a discharging request. As for the numerical value in parentheses of each of the electric vehicles 10a and the charging and discharging devices 30a, the smaller the numerical value is, the shorter the distance from the customer 80a becomes. Although not particularly limited, for example, correction may be made such that, as a power transmission distance from the customer 80a reduces (that is, the numerical value in parentheses reduces), the deterioration acceleration element value increases, and the priority order may be assigned based on the corrected deterioration acceleration element value. The deterioration acceleration element value may be corrected, for example, based on the power transmission distance and a power transmission loss ratio. Correction of the deterioration acceleration element value and change of the priority order based on the power transmission distance may be performed on one or more on-vehicle batteries 11.

The charging and discharging management device 40 may be configured to determine, in response to the discharging request from the electric power system 70, a discharge rate of each of the plurality of electric vehicles 10a, based on the deterioration acceleration element values of the plurality of electric vehicles 10a. In this embodiment, the second determination controller 65 is configured or programmed to determine the discharge rate of discharging from each of the on-vehicle batteries 11 of the electric vehicles 10a using the priority order based on the deterioration acceleration element values assigned by the first determination controller 64. The discharge rate of each of the electric vehicles 10a can be determined such that a discharge amount is larger for the on-vehicle battery 11 of the electric vehicle 10a with a higher priority. Although there is no particular limitation on a method for determining the discharge rate, for example, a correspondence table for the deterioration acceleration element value and the charge and discharge rate may be registered in the second determination controller 65. In the correspondence table, the charge and discharge rate may be set so as to reduce as the deterioration acceleration element value increases. By setting the discharge rate to a low level, for example, increase of the battery temperature during discharging is reduced. As a result, progress of deterioration of the on-vehicle battery 11 can be suppressed.

The instruction controller 66 is configured or programmed to instruct the charging and discharging device 30a to perform charging and discharging on the electric vehicle 10a. Herein, the instruction controller 66 instructs the charging and discharging device 30a to discharge electric power to the electric power system 70 from the electric vehicle 10*a* determined based on the priority order based on the deterioration acceleration element values. Herein, the instruction controller 66 transmits a discharge signal to the charging and discharging device 30*a* to which the electric vehicle 10*a* is connected via the communication controller 51. The instruction controller 66 may be configured or programmed to, for example, simultaneously transmit the discharge signal to the plurality of electric vehicles 10*a* determined by the first determination controller 64 as the electric vehicles 10 that are caused to discharge electric power and may be configured to transmit the discharge signal sequentially to the electric vehicles 10*a* in an order from the electric vehicle 10*a* with a higher priority. The instruction controller 66 may be configured to transmit information of the discharge rates determined by the second determination controller 65 to the charging and discharging devices 30*a* simultaneously with the discharge signal.

When the charging and discharging device 30*a* receives the discharge signal and the information of the discharge rate via the communication controller 33, the execution controller 35 is configured or programmed to execute discharging to the electric power system 70 from the on-vehicle batteries 11 of the electric vehicles 10*a*. Thus, electric power is discharged to the electric power system 70 from the electric vehicle 10*a* determined by the first determination controller 64 at the discharge rate determined by the second determination controller 65.

In the above-described embodiment, a case where there is the discharging request from the electric power system 70 has been described, but similar control can be performed in a case where there is a charging request from the electric power system 70. The charging and discharging management device 40 can assign, in response to the charging request from the electric power system 70, a priority order of the plurality of electric vehicles 10*a*, based on the deterioration acceleration element values of the plurality of electric vehicles 10*a*. When there is the charging request from the electric power system 70, the priority order can be assigned to the plurality of electric vehicles 10*a* in an order from the electric vehicle 10*a* with a lower deterioration acceleration element value.

In a case where there is the charging request from the electric power system 70, similar to the case where there is the discharging request, the charging and discharging management device 40 may be configured to determine, in response to the charging request from the electric power system 70, a charge rate of each of the plurality of electric vehicles 10*a*, based on the deterioration acceleration element values of the plurality of electric vehicles 10*a*. The second determination controller 65 may be configured to determine the charge rate of each of the on-vehicle batteries 11 such that a charge rate becomes lower for the on-vehicle battery 11 of the electric vehicle 10*a* with a higher priority. In general, by charging at a high charge rate, a risk that capacity deterioration or the like of the on-vehicle battery 11 progresses is increased. By suppressing the charge rate of the electric vehicle 10*a* having a high deterioration acceleration element value to a low level, progress of deterioration of the on-vehicle battery 11 can be suppressed.

In the above-described embodiment, the charging and discharging management device 40 is configured such that a process of acquiring the information D1 on the predetermined deterioration acceleration element for the on-vehicle batteries 11 from the plurality of electric vehicles 10*a* connected to the electric power system 70, a process of arithmetically operating the deterioration acceleration element values of the plurality of electric vehicles 10*a*, based on the predetermined arithmetic operation method, based on the deterioration acceleration element information, and a process of controlling charging from the electric power system 70 of the plurality of electric vehicles 10*a* or discharging to the electric power system 70 are executed based on the deterioration acceleration element values of the plurality of electric vehicles 10*a*. By controlling charging and discharging based on the deterioration acceleration element values, deterioration of the on-vehicle batteries 11 can be reduced. For example, in this embodiment, the battery temperature and the SOC are set as the information D1 on the deterioration acceleration element. Among the plurality of electric vehicles 10*a*, for the electric vehicle 10*a* on which the on-vehicle battery 11 having a high battery temperature and a high SOC is mounted, the deterioration acceleration element value is highly evaluated. For the electric vehicle 10*a* having a high deterioration acceleration element value, the charging and discharging management device 40 can reduce the SOC by discharging, refrain charging such that the SOC is not increased, and perform control of reducing the charge and discharge rate, or the like using the deterioration acceleration element values. Thus, deterioration of the on-vehicle battery 11 can be reduced.

In the above-described embodiment, in response to the discharging request from the electric power system 70, the priority order of the plurality of electric vehicles 10*a* is assigned based on the deterioration acceleration element values of the plurality of electric vehicles 10*a*. In response to the discharging request, discharging is preferentially performed from the electric vehicle 10*a* on which the on-vehicle battery 11 having a high deterioration acceleration element value (in this embodiment, having high temperature and a high SOC) is mounted. Thus, deterioration of the on-vehicle battery 11 of the electric vehicle 10*a* that is caused to be preferentially discharged can be suppressed.

Similarly, in response to the charging request from the electric power system 70, the priority order of the plurality of electric vehicles 10*a* is assigned based on the deterioration acceleration element values of the plurality of electric vehicles 10*a*. In response to the charging request, electric power is preferentially charged from the electric vehicle 10*a* on which the on-vehicle battery 11 having a low deterioration acceleration element value (in this embodiment, having low battery temperature and a low SOC) is mounted. Thus, charging is not preferentially performed on the electric vehicle 10*a* on which the on-vehicle battery 11 having a high risk of deterioration progress (having a high deterioration acceleration element value) and the electric vehicle 10*a* on which the on-vehicle battery 11 having a low risk of deterioration progress is mounted is preferentially charged. As a result, in the on-vehicle battery 11 having a high risk of deterioration progress, progress of deterioration can be reduced.

In the above-described embodiment, as the information D1 on the deterioration acceleration element, the SOC information and the temperature information of the on-vehicle battery 11 are included. According to findings of the present inventors, the SOC and the temperature of the on-vehicle battery 11 largely contribute to progress of deterioration of the on-vehicle battery 11. The SOC and the temperature of the on-vehicle battery 11 can be easily quantitatively measured. Therefore, a deterioration acceleration element value having higher appropriateness can be used.

In the above-described embodiment, the power transmission distance between a portion in which each of the electric vehicles 10a is connected and a position in which there is a discharging request from the electric power system 70 is calculated and the priority order of the plurality of electric vehicles 10a can be further assigned based on the power transmission distance. In discharging electric power to the electric power system 70 from the on-vehicle battery 11 of the electric vehicle 10a, electric power that is supplied is transmitted to the equipment of the customer 80 through a power transmission line and a power distribution line. When the electric power is transmitted through the power transmission line and the power distribution line, a so-called power transmission and distribution loss occurs and a part of power is lost. By assigning the priority order in consideration of the power transmission distance when electric power is charged from the on-vehicle battery 11, waste of electric power can be reduced.

The technology disclosed herein can be applied to operation management of electric vehicles in a business office owning a plurality of electric vehicles. For example, deterioration acceleration element values of the plurality of electric vehicles owned by the business office are calculated in accordance with the above-described method and are managed by a charging and discharging management device in the business office. The charging and discharging management device can reduce deterioration of on-vehicle batteries by instructing preferential discharge of an electric vehicle having a high deterioration acceleration element value. The charging and discharging management device may be also configured to instruct a driver, when the driver uses any one of the electric vehicles, to use an electric vehicle having a high deterioration acceleration element value. Thus, deterioration of the on-vehicle batteries can be reduced.

A chairing and discharging management device disclosed herein has been described above in various manners. The embodiment or the like described herein shall not limit the present disclosure, unless specifically stated otherwise. Various changes can be made to the charging and discharging control device disclosed herein and each of components and processes described herein can be omitted as appropriate or can be combined with another one or other ones of the components and the processes as appropriate, unless a particular problem occurs.

What is claimed is:

1. A charge and discharge management device, comprising:
    an acquisition controller configured or programmed to acquire information on a predetermined deterioration acceleration element for on-vehicle batteries from a plurality of electric vehicles connected to an electric power system;
    an arithmetic controller configured or programmed to arithmetically operate deterioration acceleration element values of the plurality of electric vehicles, based on a predetermined arithmetic operation method, based on the information on the deterioration acceleration element; and
    a determination controller configured or programmed to control charging the plurality of electric vehicles from the electric power system or discharging the electric power system from the plurality of electric vehicles, based on the deterioration acceleration element values of the plurality of electric vehicles, wherein
    the arithmetic controller is configured or programmed to determine a score corresponding to the information by using a table illustrating a relationship between the information and the score that is scored in association with a deterioration acceleration risk, and
    calculate a deterioration acceleration element value of the deterioration acceleration element values by sequentially integrating the score, and
    the determination controller includes a first determination controller configured or programmed to, in response to a charging and discharging request from the electric power system, assign a priority order of the plurality of electric vehicles in a descending order of the deterioration acceleration element values of the plurality of electric vehicles.

2. The charge and discharge management device according to claim 1, wherein
    the first determination controller is configured or programmed to, in response to a discharging request from the electric power system, assign the priority order of the plurality of electric vehicles, based on the deterioration acceleration element values of the plurality of electric vehicles.

3. The charge and discharge management device according to claim 2, wherein
    the first determination controller is configured or programmed to
    acquire positional information of a position in which each of the plurality of electric vehicles is connected to calculate a power transmission distance between the position in which an electric vehicle of the plurality of electric vehicles is connected and a position in which there is a discharging request from the electric power system, and
    further assign the priority order of the plurality of electric vehicles, based on the power transmission distance.

4. The charge and discharge management device according to claim 1, wherein
    the determination controller further includes a second determination controller configured or programmed to, in response to a discharging request from the electric power system, determine a discharge rate of each of the plurality of electric vehicles, based on the deterioration acceleration element values of the plurality of electric vehicles.

5. The charge and discharge management device according to claim 1, wherein
    the first determination controller is configured or programmed to, in response to a charging request from the electric power system, assign the priority order of the plurality of electric vehicles, based on the deterioration acceleration element values of the plurality of electric vehicles.

6. The charge and discharge management device according to claim 1, wherein
    the determination controller further includes a second determination controller configured or programmed to, in response to a charging request from the electric power system, determine a charge rate of each of the plurality of electric vehicles, based on the deterioration acceleration element values of the plurality of electric vehicles.

7. The charge and discharge management device according to claim 1, wherein
    the information on the deterioration acceleration element includes at least state of charge (SOC) information and temperature information for the on-vehicle batteries.

8. The charge and discharge management device according to claim 7, further comprising:

a storage that stores a map in which a relationship between a state of charge (SOC) and temperature of each of the on-vehicle batteries and a corresponding one of the deterioration acceleration element values is indicated in advance, wherein the arithmetic controller is configured to arithmetically operate the deterioration acceleration element values of the on-vehicle batteries, based on information of the SOC and the temperature acquired from each of the on-vehicle batteries and the map.

9. The charge and discharge management device according to claim 2, wherein a plurality of customers is connected to the electric power system, the first determination controller is configured or programmed to, in response to a discharging request from any of the plurality of customers connected to the electric power system, acquire positional information of an electric vehicle, among the plurality of electric vehicles, connected to the electric power system, calculate a power transmission distance between a position in which the electric vehicle is connected and a position of the any of the plurality of customers, correct the deterioration acceleration element value so that the deterioration acceleration element value increases as the power transmission distance from the any of the plurality of customers reduces, and assign the priority order of the plurality of electric vehicles based on the corrected deterioration acceleration element value.

10. The charge and discharge management device according to claim 1, wherein the acquisition controller is configured or programmed to acquire a temperature of the on-vehicle batteries and a state of charge (SOC) of the on-vehicle batteries repeatedly at certain intervals, the table includes
a battery temperature table illustrating a relationship between the temperature and the score, and
an SOC table illustrating a relationship between the SOC and the score, and the arithmetic controller is configured or programmed to determine the score by adding Score 1 determined from the battery temperature table and the temperature and Score 2 determined from the SOC table and the SOC.

11. The charge and discharge management device according to claim 6, wherein the second determination controller is configured or programmed to, in response to a discharging request from the electric power system, determine a discharge rate of each of the plurality of electric vehicles such that a discharge amount is larger for an on-vehicle battery of an electric vehicle, among the plurality of electric vehicles, with a higher priority, and the second determination controller is configured or programmed to, in response to the charging request from the electric power system, determine the charge rate of each of the plurality of electric vehicles such that a charge amount is lower for the on-vehicle battery of the electric vehicle with the higher priority.

\* \* \* \* \*